United States Patent
Dillon et al.

(10) Patent No.: US 11,032,175 B2
(45) Date of Patent: Jun. 8, 2021

(54) PACKET LOSS ISOLATION TEST

(71) Applicants: Douglas Dillon, Germantown, MD (US); Alex Pham, Germantown, MD (US); Daniel Miller, Germantown, MD (US)

(72) Inventors: Douglas Dillon, Germantown, MD (US); Alex Pham, Germantown, MD (US); Daniel Miller, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 57 days.

(21) Appl. No.: 16/413,743

(22) Filed: May 16, 2019

(65) Prior Publication Data

US 2020/0213212 A1     Jul. 2, 2020

Related U.S. Application Data

(60) Provisional application No. 62/786,735, filed on Dec. 31, 2018.

(51) Int. Cl.
*H04L 12/26* (2006.01)
*H04L 29/06* (2006.01)

(52) U.S. Cl.
CPC .......... *H04L 43/0829* (2013.01); *H04L 43/10* (2013.01); *H04L 43/16* (2013.01); *H04L 69/16* (2013.01)

(58) Field of Classification Search
CPC ..... H04L 41/0677; H04L 69/16; H04L 43/10; H04L 43/16; H04L 43/0829; H04W 28/0289; H04W 48/16
See application file for complete search history.

(56) References Cited

U.S. PATENT DOCUMENTS

| 7,860,017 | B2 | 12/2010 | Montwill | |
|---|---|---|---|---|
| 2003/0039216 | A1* | 2/2003 | Sheldon | .................. H04L 43/00 370/260 |
| 2004/0066759 | A1* | 4/2004 | Molteni | ................ H04L 41/048 370/329 |
| 2015/0124629 | A1* | 5/2015 | Pani | ..................... H04L 61/2007 370/248 |
| 2016/0142278 | A1 | 5/2016 | Pignataro et al. | |
| 2017/0155590 | A1* | 6/2017 | Dillon | ................. H04L 41/5025 |
| 2018/0183755 | A1* | 6/2018 | Mitchell | ............. H04L 61/1541 |

OTHER PUBLICATIONS

International search report for International application No. PCT/US2019/066720.

* cited by examiner

*Primary Examiner* — Ricardo H Castaneyra
(74) *Attorney, Agent, or Firm* — Capitol City TechLaw; Jasbir Singh (57) ABSTRACT

A method for isolating packet loss on a hierarchical packet network, the method including: connecting a first network element (NE) to a second NE via a varying path traversing multiple network segments; discovering, with the first NE, a set of segment-demarcation expect-to-echo nodes along the varying path; ascertaining, with the first NE, a request-to-echo configuration for each node in the set; emitting a sample size of requests-to-echo in a respective request-to-echo configuration for each node in the set at a sample rate; receiving results of the sample size of requests-to-echo to generate a packet-loss sample; and calculating a rate-of-loss for the packet-loss sample.

18 Claims, 8 Drawing Sheets

PACKET LOSS ISOLATION TEST

CROSS REFERENCE TO RELATED APPLICATIONS

The present application claims the benefit of U.S. Provisional Application No. 62/786,735 filed Dec. 31, 2019, the contents of which are incorporated herein in its entirety.

FIELD

A system and method to provide a Packet Loss Isolation Test (PLIT) to determine and isolate packet loss to a single network segment. A segment of a network is one or more hops whose installation or maintenance or both is administered by a service provider, which may include but not be limited to: an information technology (IT) department within an enterprise, a $3^{rd}$-party out-sourced technician firm, an Internet service provider (ISP), or a telecom service provider. PLIT operates by split-tunnel pinging different segment-demarcation ping-points along the path and then compares those results to deduce which of the segments lost the packets.

This disclosure relates to packet networks whose source and destination are connected over multiple segments. In particular, the present teachings relate to interpolation so that a length of maximal substantial burst of loss may be approximately measured for each sampling interval.

BACKGROUND

The prior art uses ping commands and other packet exchanges to identify unidirectional packet loss between two hosts. The statistics measure packet loss between the hosts but provide no visibility into where along the path the packets were dropped.

The problem is to isolate where the packets are dropped for private networks over the public Internet as a different organization or person may be responsible depending on where the packets are dropped. For example, a VPN connection from a branch office to a datacenter may be experiencing packet loss. The packet loss can be in the networking equipment at the branch office, in an Internet Service Provider (ISP) or Network Access Provider (NAP) for the branch office, in the public Internet, or the like. The provides connectivity from a given customer location to the public internet in the form of the last-mile (e.g., DSL link to central office) and middle mile (NAP provided networking that ends up being able to exchange packets with the public internet). The present teachings allow a host to confirm definitively where the packet loss is happening and take remedial action or notify a responsible organization or person to correct the problem.

A packet network in the smallest is a subnetwork that is a broadcast domain of a physical-carrier of the packets carried on a communications medium of that subnetwork; such a packet network is called a packet subnetwork, or merely a subnetwork when context implies packets. A commonplace example of a packet is a layer-3 Internet Protocol packet, as defined in RFC791 or RFC8200. A somewhat larger packet network may be formed by a network of these subnetworks via a network element steering each packet from an upstream hop or link to a downstream hop or link; such a packet network is called a packet local-area network (LAN), or merely a LAN when context implies packets. A larger packet network may be formed by a network of packet LANs via a network element steering each packet from an upstream hop or link to a downstream hop or link; such a packet network is called an enterprise packet intranet, or merely an intranet when context implies an enterprise and packets. An even larger packet network may be formed by a network of enterprise packet intranets among multiple enterprises and/or of packet LANs in each of multiple residences and/or small-business offices and/or branch offices via a network element steering each packet from an upstream hop or link to a downstream hop or link; such a packet network is called a packet service-provider (PSP) network; such a PSP network is called a packet Network-Access Provider (NAP) when the enterprise packet intra-network is one network element away from the packet WAN, as defined next; such a packet NAP is called merely a NAP when context implies packets. A commonplace example of a PSP network is the network of an Internet service provider (ISP), where the packets are layer-3 Internet Protocol packets. A still larger packet network may be formed by a network of these PSP networks and/or packet NAPs via a network element steering each packet from an upstream hop or link to a downstream hop or link; such a packet network is called packet wide-area network (WAN), or merely a WAN when the context implies packets. When a packet WAN is a packet network for hire between PSPs and/or packet NAPs, such a packet WAN is called a packet carrier network, or a carrier network when context implies packet. A still more-macroscopic view of this entire tree of WAN(s), intranets, PSPs, LANs, and subnets is called a hierarchical packet network, or merely a hierarchical network when context implies packets.

Each packet LAN (or even collections of packet subnetworks thereof), each packet enterprise intranetwork, each PSP network, each NAP, and each WAN is a separate segment because it is administered by a different organization or person. These segments might be housed at a branch office or home office or small business as origin or destination, a packet-network service-provider thereof, a WAN transit provider, an enterprise or datacenter as opposing destination or origin, a packet-network service provider or network-access provider thereof, and perhaps other intermediaries in between any pair thereof.

Whenever any anomaly arises in a hierarchical packet network, identifying an at-fault segment is important to contact one out of the potentially multiple service providers at fault, to expedite repair, to recover penalties for that service provider's violation of a service-level-agreement (SLA) or the like. As a packet is conveyed from origin to destination from, say, a branch office across the branch office's LAN across the branch office's PSP across a WAN to, say, an enterprise's intranet, that packet may be conveyed by multiple segments. Each traversed segment of the packet network may be managed/provided by a different person, organization or jurisdiction. The prior art fails to provide an easy inexpensive investigation apparatus or method for determining the identity of the at-fault segment. The prior art's investigation method is to expend significant amounts of time of highly-trained expensive experts to manually check continuity in customized ways and take an intolerable amount of time due to human labor.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings discover where along a network path between a first network element (originator) and a second network element (destination) to "ping" in order to determine which party is responsible for causing (and thus fixing) a packet loss. The automatic discovery eliminates a troublesome need to determine a site-specific configuration or segment demarcation nodes to ping. A network path may include multiple segments. Each segment may include multiple interconnected links. The network path may traverse multiple links of the multiple segments. In some embodiments, the links used by each segment to provide the network path may vary over the life of a connection or session using the network path.

In some embodiments, the packets exchanged between the hosts support a Virtual Private Network tunnel (e.g. an IPSec tunnel) and present teachings use split-tunnel (defined below; also known as, direct to internet) ping transactions to the determined locations along the path to determine which party is responsible. Split-tunnel pings provide visibility into where along the path the packets are being lost. In some embodiments, the present teachings use multiple sets of pings to the different locations to determine where the packet loss is occurring. In some embodiments, the packet loss isolation test is automatically invoked when packet loss rises above a threshold tolerance level.

The present teachings periodically emit packets that should cause a reply packet from a network element known to be at the perimeter of or within a segment of a hierarchical packet network. By emitting enough such periodic requests-for-reply during a sampling interval, a loss-curve of rising and falling loss rates can be interpolated as causes of intermittent packet loss rise gradually or fall gradually. By emitting such periodic requests-for-reply at known inter-request timing and thus at roughly known expected inter-reply timing, loss of consecutive request and/or reply packets can reveal a burst loss whose onset rise of cause-of-loss and/or whose abatement fall of cause-of-loss is so rapid that interpolating the aforementioned loss-curve became impractical or impossible due to the fundamental law of interpolation (defined below).

In some embodiments, the discovery performs a traceroute operation with domain name lookups and determining from the domain names which hops are inside of which ISP. In some embodiments, evidence of an ISP dropping packets is gathered by pinging an interface of a node immediately prior to an ISP and by pinging an interface of a node immediately after an ISP and comparing the packet loss.

In some embodiments, the present teachings provide a packet loss test where the ping type (ping configuration) is discovered by trying multiple ping types. In some embodiments, the present teachings provide packet loss test where split-tunnel pinging of various ping points is used to deduce the network segment that is causing packet loss experienced by tunneled packets. In some embodiments, the present teachings provide discovery of network segments traversed by a packet tunnel by performing a split-tunnel trace route and then examining changes in domains of the nodes along the tunnel's path. In some embodiments, the present teachings provide discovery of network segments traversed by a packet tunnel by performing a split-tunnel trace route and then examining transitions from private IP addresses to public IP addresses of the nodes along the tunnel's path.

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a method for isolating packet loss on a hierarchical packet network, the method including: connecting a first network element (NE) to a second NE via a varying path traversing multiple network segments; discovering, with the first NE, a set of segment-demarcation expect-to-echo nodes along the varying path; ascertaining, with the first NE, a request-to-echo configuration for each node in the set; emitting a sample size of requests-to-echo in a respective request-to-echo configuration for each node in the set at a sample rate; receiving results of the sample size of requests-to-echo to generate a packet-loss sample; and calculating a rate-of-loss for the packet-loss sample. Other embodiments of this aspect include corresponding computer systems, apparatus, and computer programs recorded on one or more computer storage devices, each configured to perform the actions of the methods.

Implementations may include one or more of the following features. The method further including accumulating multiple packet-loss samples over a reporting interval. The method further including calculating an accumulated rate-of-loss for the reporting interval. The method where the reporting interval is selected from one of an hour, a day, a few days, a week, two-weeks, or a month. The method where the emitting emits packets marked with different Class of Service (COS)-categorizers per packet-loss sample in a round-robin fashion. The method further including gathering the multiple packet-loss samples from performing the emitting at multiple locations and correlating the gathered multiple packet-loss samples to a geospatial map or one of the segments along the network path. The method where the discovering includes identifying a traceroute protocol for each node of the set. The method where a ping configuration for each node includes an ICMP port 7 echo request-to-echo, a TCP port 7 echo request-to-echo, a UDP port 7 echo request-to-echo, a UDP port 1967 request-to-echo, or a combination thereof. The method where the set includes a Modem Ping-Point (MPP). The method where the set includes an Ingress Ping-Point (IPP). The method where the set includes an Egress Ping-Point (EPP). The method where the first NE includes a split-tunnel connection along the network path, and the discovering discovers different segment-demarcation nodes along the split-tunnel connection. The method further including discerning an onset of excessive rate of packet-loss by comparing the rate-of-loss with an onset threshold; comparing the results along the split-tunnel connection; and deducing an at-fault segment based on the comparison. The method where the request-to-echo configuration includes a TTL-time-exceeded traceroute request-to-echo, a fragmentation-reassembly-time-exceeded traceroute request-to-echo, a df-MTU-destination-unreachable traceroute request-to-echo, a UDP packet destined for port 123 with a Time to Live (TTL) set to decrement to zero at a respective node, a TCP packet for a port other than 80 with a TTL set to decrement to zero at the respective node, or a combination thereof. The method where the request-to-echo configuration includes an ICMP port 7 echo request-to-echo, a TCP port 7 echo request-to-echo, a UDP port 7 echo request-to-echo, a UDP port 1967 request-to-echo, or a combination thereof. The method where the request-to-echo configuration utilizes a configured protocol and port. The method where the request-to-echo configuration includes multiple request-to-echo configurations. The method where the ascertaining includes sending, in parallel, a request-to-echo in each of the multiple request-to-echo configurations. The method where the emitting emits packets, in parallel, a request-to-echo to each node of the set. The method where the receiving includes tabulating packet responses and packet losses. The method where the calculating calculates a length-of-burst-loss for the packet-loss sample. The method further including discerning an onset of excessive rate of packet-loss by comparing the rate-of-loss with an onset threshold; and deducing an at-fault segment based on the results. The method further including discerning an abatement of already-onset excessive rate of packet-loss is by comparing the rate-of-loss with an abatement threshold, or in some embodiments forcing abatement due to the end of a reporting interval. The method further including observing a misbehavior of packet traffic, with a third NE different from the first NE and the second NE. The method may also include triggering a periodic performance of the emitting. The method where the hierarchical packet network includes a single-COS layer-3 network, a single-COS WAN network, a COS-categorized layer-3 network, a COS-categorized WAN network, a COS-categorized layer-2 container network, or a combination thereof. The method further including determining the sample size and the sample rate based on a bandwidth subscription of the first NE. Implementations of the described techniques may include hardware, a method or process, or computer software on a computer-accessible medium.

One general aspect includes an underlay monitor to isolate packet loss on a hierarchical packet network, the underlay monitor including: a first Network Element (NE) connected to a second NE via a varying path traversing multiple network segments; a discoverer to discover, with the first NE, a set of segment-demarcation expect-to-echo nodes along the varying path, and to ascertain, with the first NE, a request-to-echo configuration for each node in the set; an emitter to emit a sample size of requests-to-echo in a respective request-to-echo configuration for each node in the set at a sample rate; a receiver to receive results of the sample size of requests-to-echo to generate a packet-loss sample; and a calculator to calculate a rate-of-loss for the packet-loss sample.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose a Packet Loss Isolation Test (PLIT) that isolates packet loss to a network segment. Exemplary network segments include: an ISP or NAP segment, a public Internet segment, a POP Internet Access (from the VPN Gateway to the Public Internet) segment, and a POP Infrastructure (between a data center host and the VPN Gateway) segment.

In this disclosure, ping is utilized as a convenient generic term for a variety of uses of various protocols elaborated below, not merely ping's oldest historical embodiment of RFC792's ICMP Echo protocol on port 7. In this disclosure, trace route is utilized as a convenient generic term for a variety of uses of various protocols elaborated below, not merely trace route's oldest historical embodiment as described in RFC1393. In this disclosure, underlay monitor is utilized as a convenient term for packet-loss-test's and TELQO's apparatus and behavior as described in this disclosure.

Figure 1:
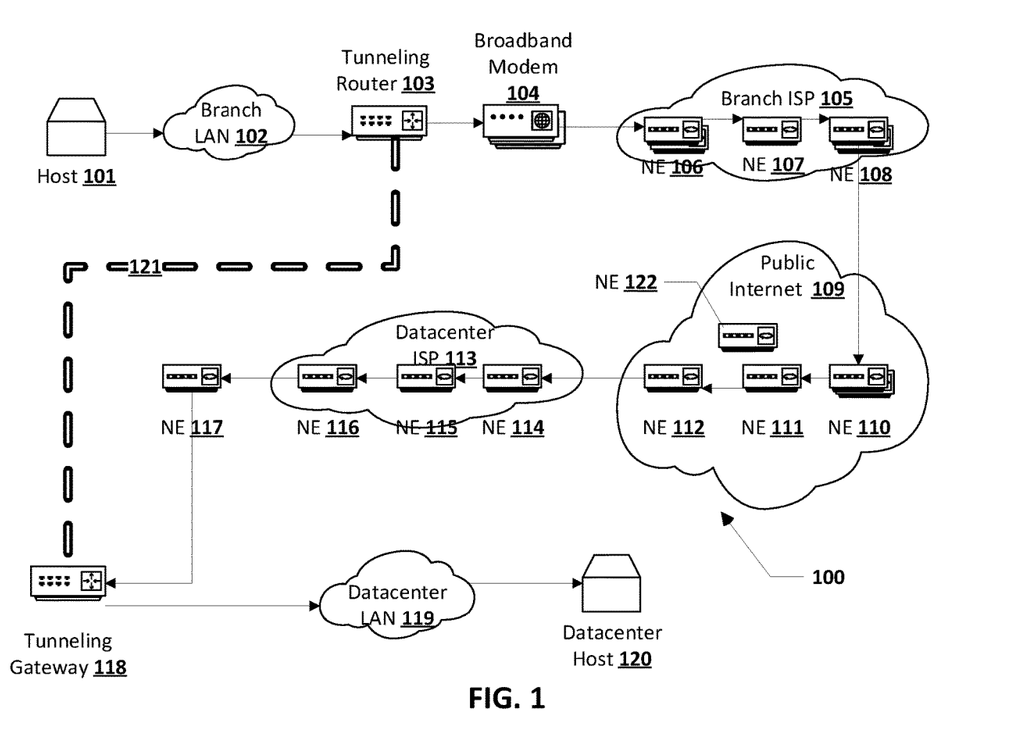
FIG. 1 illustrates a block diagram of a packet network according to various embodiments.

FIG. 1 illustrates a block diagram of segments in a hierarchical packet network according to various embodiments.

An exemplary packet network 100 as illustrated in FIG. 1 is a hierarchical packet network because public internet 109 can be considered a root of a tree of sorts, and a host 101 and a datacenter host 120 as leaves, such that any conveyance of packets in the packet network 100 traverses from host 101 through branches-of-the-tree, namely, a tunneling router 103, a broadband modem 104, a branch ISP cloud 105 (itself a walk of branches-of-the-tree via an NE 106, an NE 107 and an NE 108), the public internet 109, a datacenter ISP 113 (itself a walk of an NE 114, an NE 115, and an NE 116), an NE 117, a tunneling gateway 118, and a datacenter LAN 119 to arrive at a destination host 120 as leaf, and vice versa the datacenter host 120 originates the packet destined for the host 101. Herein, each intermediary device between the hosts 101, 120 is called a network element (NE), while the ultimate origin and destination terminating ends of an end-to-end conveyance of application-domain packets in a hierarchical packet network are called a host. The hierarchical packet network 100 in FIG. 1 includes a plurality of NEs from 103 to 118 that are shown for illustrative purposes, and the hierarchical packet network 100 may include a different count and sequence of NEs. The hierarchical packet network 100 in FIG. 1 includes a plurality of NEs from 103 to 118 that may lose connectivity at each link or that may become inoperable. For brevity, FIG. 1 depicts only one such walk between two such hosts. In practice, the worldwide hierarchical packet network includes a plurality of origin hosts and a plurality of destination hosts, and therefore a plurality of linear leaf-to-root-to-leaf walks. Moreover, the term host is used for convenience; a network element may be a host.

A tunnel 121 may be established between the tunneling router 103 and the tunneling gateway 118. In some embodiments, the tunneling router 103 and the tunneling gateway 118 could be elided from FIG. 1 of the hierarchical packet network 100 when tunneling is not present. In some embodiments, the tunneling router 103 and the tunneling gateway 118 may use the Virtual Private Network (VPN), or some other Layer-3 tunneling or Layer-2 conduit technology. In some embodiments, the broadband modem 104 could be elided from FIG. 1 when the ISP 105 presents a Layer-2 technology that is already utilized in the branch LAN 102, including but not limited to Ethernet. In some embodiments, the NE 117 could be elided from FIG. 1. Destinations other than the tunneling gateway 118, the datacenter LAN 119 and the datacenter host 120 may be reached via an additional path comprised of the hops underlying 121 effectively defeating 121 for certain designated packets, which in some embodiments may be called a split tunnel or direct to Internet.

The present teachings use various request-to-echo protocols including ICMP echo implemented, for example, per the ping command in Unix, Linux, Microsoft Windows, and various other operating systems. The broadcast modem 104 acts as a Modem Ping-Point (MPP) in the branch office, the NE 110 acts as an Ingress Ping-Point (IPP) of the ISP that connects the branch office to the public Internet 109, the NE 112 acts as an Egress Ping-Point (EPP) of the ISP or NAP that serves the datacenter, the tunneling gateway 118 can be thought of as a VPN Ping-Point (VPP) of the datacenter, and the datacenter host 120 acts as a Datacenter Ping-Point (DPP) relatively deep within the datacenter. The datacenter host 120 may be disposed in a private datacenter, a tenant virtual machine within public cloud-computing landlord, or the like. Even when request-for-echo protocols other than ICMP echo are utilized to obtain (or attempt to obtain) echo or reply packets from the packet network 100, the MPP, IPP, EPP, VPP, and DPP names are still deemed valid and proper, despite the misnomer of the word "ping" being utilized. In some embodiments, one or more of 103, 117 and 122 may be elided. In some embodiments, a discovery for the set of expected-to-echo nodes may not identify the MPP, IPP or EPP.

Of especial interest is a set of links {103 to 104, 104 to 110, 110 to 112, 112 to 118} that convey the tunnel 121. In many traffic usage scenarios, traffic flows through the tunnel 121, where higher orders of the network and the application domain thereof are relatively oblivious of the set of links conveying 121. When packet loss occurs in traffic flowing through the tunnel 121, the application domain is relatively oblivious as to which link or plurality thereof in the set is at fault for contributing to the loss observed at the tunnel 121; the loss may be observed at only one member of the set or may be observed at a proper subset of the set, and not at each and every member of the set. The present teachings focus on the packet-loss characteristics of the links of the set. The tunnel 121 lacks visibility into various segments of the hierarchical packet network between the tunneling router 103 and the terminal and Gateway 118. Likewise, the tunnel 121 lacks visibility into segments over which the hierarchical packet network traverses. Hence the tunnel 121 cannot be used to observe the packet-loss characteristics of one or more at-fault links or segments.

In some embodiments, an underlay monitor including the PLIT may be disposed in one or more of the host 101, the terminal router 103, or the broadband modem 104 to perform packet-loss test-runs to any or all downstream expected-to-echo nodes, for example, the NEs 110, 112, 117; the tunneling gateway 118, or the datacenter host 120. In an exemplary embodiment, only one underlay monitor may be deployed in the packet network 100. The underlay monitor including the PLIT may be deployed in one or more of the datacenter host 120 or the tunneling gateway 118 to perform packet-loss test-runs to any or all downstream expected-to-echo nodes.

The network 100 may be an arc of one end-to-end path. The host 101 may be utilizing multiple routes of multiple branch ISPs 121 and/or multiple 102-to-120 paths without 121 being present. In such embodiments of the hierarchical network, the underlay monitor may evoke packet-loss test-runs for each to traverse a different path of nodes/NEs, either to the same 120 or to different 120s.

Packet Routing

Tunneling Router 103 is responsible for routing packets thru the tunnel 121 or directly through Branch ISP 105 without being carried by the tunnel 121. Such routing of packets directly is referred to as split-tunnel. PLIT echo request packets (and their replies) addressed to (or from) the MPP, IPP, EPP and VPP must be routed directly. In some embodiments Tunnel Router 103 identifies those packets to be sent directly based on the source address and source routes packets either through the tunnel 121 or directly through the ISP 105. In those embodiments, PLIT selects the appropriate source IP address for echo requests to have those echo requests follow the desired split-tunnel path.

The hierarchical network 100 conveys application-domain traffic from an origin to a destination in the hierarchical packet-network for a plurality of origins and a plurality of destinations. An upper bound may be placed on the maximum occupancy of a link that packet-loss test-probes can occupy on a per-link basis. A fallow period in each test-probe's cycle may be extended such that the occupancy of carrying capacity of a link is kept at or below an upper bound. This upper-bound on occupancy of carrying capacity of a link in the hierarchical packet network is herein called the bandwidth ceiling on packet-loss test runs. The lower bound on occupancy of carrying capacity of a link in the hierarchical packet network is herein called the bandwidth floor of application-domain traffic.

When viewed from the application domain downward, the hierarchical packet network 100 in FIG. 1 may be considered a quasi-recursive layering of packets within packets within frames within frames, where a higher-order packet or frame is contained in the payload of the next-lower-order frame or packet. Exemplary Layer-3 packets include Internet Protocol version 4 (IPv4) and Internet Protocol version 6 (IPv6). The lowest-order of frames is conveyed on an analog-domain physical-medium link having one or more nesting layers. The layers start at Layer 0 for nesting a plurality of analog-domain physical mediums within a more-fundamental analog domain physical medium (e.g., a plurality of lambdas as wavelengths of light within a physical fiber-optic cable). Layer 1 is the representation of binary digit 0 or 1 via an analog-domain artifact in physics (e.g., the off or on pulse of light in a fiber-optic cable). Layer 2's frames are fixed-length point-to-point conduits within conduits. Layer 3 is where packets have a lifetime that traverses a sequence of a potential plurality of Layer-2 conduits. The uppermost Layer-2 conduit into which Layer-3 packets are laid in sequence (within that outermost Layer-2 conduit's frames) is called a hop. The outermost Layer-2 conduit of a hop is called a link. When an outer Layer-3 packet contains in its payload another Layer-3 packet, the outer Layer-3 packet is called a tunnel. Layer-3 tunnel 121 in FIG. 1 emulates (at Layer-3) a not-lowest conduits at Layer-2, where inner Layer-3 packet in the outer Layer-3 packet's payload are delivered branch-of-tree to branch-of-tree in the hierarchical packet network as if the tunnel 121 was the de facto root of the tree (instead of 109 being the actual root of the tree). Whenever a Layer-3 packet x is within the payload of another Layer-3 packet y, x is called the higher-order Layer-3 packet and y is called the lower-order Layer-3 packet. Whenever a Layer-3 tunnel x is within another Layer-3 tunnel y, x is called a higher-order tunnel and y is called a lower-order tunnel.

Likewise, whenever any conduit x at Layer-2 conduit is conveyed within another Layer-2 conduit y, x is called a higher-order conduit and y is called a lower-order conduit. Similar to Layer-3 tunnels, higher-order Layer-2 conduits also deliver a payload from branch-of-tree to branch-of-tree in the hierarchical packet network as if the higher-order Layer-2 conduit is the de facto root of the tree. An IETF's MPLS LSP, ITU-T's OTN ODU, IEEE's 8021.ah Ethernet MAC-in-MAC, and IEEE's 802.1 ad Ethernet Q-in-Q are each called herein a Layer-2 conduit. Some higher-order Layer-2 conduits in the hierarchical packet network have a lifetime that traverses a sequence of a plurality lower-order Layer-2 conduits. In one commonplace embodiment, the tunnel 121 is an IETF RFC2401/RFC2412 IPsec Layer-3 tunnel.

In some embodiments, whether to utilize a Layer-3 tunnel or a Layer-2 conduit over which to route packets may be conveyed is a dynamic decision. In other embodiments, all packets matching certain filtering criteria may be routed preferentially along the tunnel or the conduit or may be routed exclusively along the tunnel or the conduit. Routing based on the filtering is called policy-based routing (PBR). When the filtering is on the identity of the prior hop, the filtering is called source PBR. Alternatively, the sender of IP packets may optionally specify in the out-going packet a preplanned fixed path of links to traverse all the way to the destination. The preplanned fixed path is called IETF RFC791's strict source routing. In the present disclosure, routing of any kind over tunnel 121 may be defeated, otherwise the traceroute's and test-run's request-to-echo packets could be misrouted over the tunnel 121 instead of to various expected-to-echo nodes 104 through 117. In some embodiments, PBR or source PBR may need to be defeated at 103 and/or 108. In some embodiments, the defeating includes strict source routing where the underlay monitor overtly declares the list of nodes to traverse from underlay monitor to expected-to-echo node via the strict source route fields in the IP packet's header; in some embodiments this may be accomplished via the split-tunnel technique described above. In some embodiments, a Layer 2 conduit or Layer 3 tunnel may be selected by using different NAT pools to establish different force split conduits/tunnels that force the PLIT traffic via the split conduits/tunnels.

PLIT Test Run Overview

Figure 2:
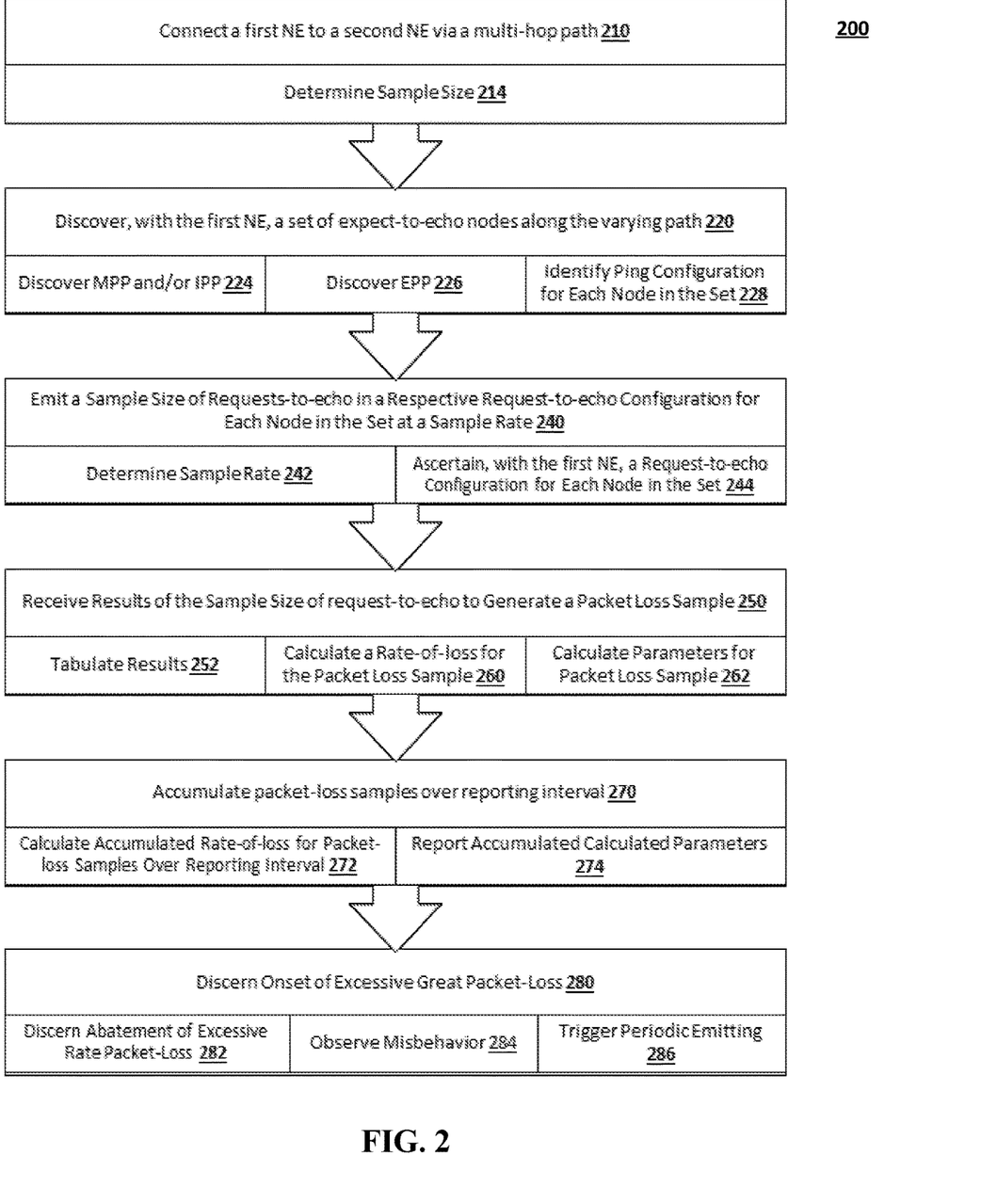
FIG. 2 illustrates a flow chart of a method for an isolation test according to various embodiments.

FIG. 2 illustrates a flow chart of a process of a packet loss isolation test according to various embodiments.

A method 200 for a packet loss isolation test includes an operation 210 to connect a first NE to a second NE via a multi-hop path. In some embodiments this establishes an IPSec tunnel from Tunneling Router 103 to Tunneling Gateway 118 where the path for those IPSec packets traverse NEs 104, 109, 113 and 117. The method 200 may include operation 214 to determine a packet-loss sample size.

The method 200 may include operation 220 to discover, with the first NE, a set of expect-to-echo nodes along the varying path. These expect to echo nodes may be referred to as ping-points. The operation 220 may utilize traceroute operations to identify nodes in the set. The method 200 may include operation 224 to discover an MPP and/or IPP. The method 200 may include operation 226 to discover an EPP. The method 200 may include operation 228 to identify a ping configuration for each node in the set identified by operation 220.

The method 200 may include operation 240 to emit a sample-size quantity (determined, for example, by operation 214) of requests-to-echo in a respective request-to-echo configuration for each node in the set at a sample rate. The method 200 may include operation 242 to determine a packet-loss sample rate. The method 200 may include operation 244 to ascertain request-to-echo configuration for each node in the set.

The method 200 may include operation 250 to receive results of the sample size of requests-to-echo to generate a packet-loss sample. The method 200 may include operation 252 to tabulate the results. The method 200 may include operation 260 to calculate a rate-of-loss for the packet-loss sample. The method 200 may include operation 262 to calculate parameters for packet-loss sample.

The method 200 may include operation 270 to accumulate packet-loss samples over a reporting interval. The method 200 may include operation 272 to calculate an accumulated rate-of-loss for packet-loss samples over reporting interval. The method 200 may include operation 274 to report accumulated calculated parameters.

The method 200 may include operation 280 to discern an onset of an excessive rate packet-loss and so provide a diagnosis of the network segment responsible for the packet loss. The method 200 may include operation 282 to discern an abatement of an excessive rate packet-loss. The method 200 may include operation 284 to observe a misbehavior of the network path. The method 200 may include operation 286 to trigger a periodic emitting.

PLIT System Overview

Figure 3:
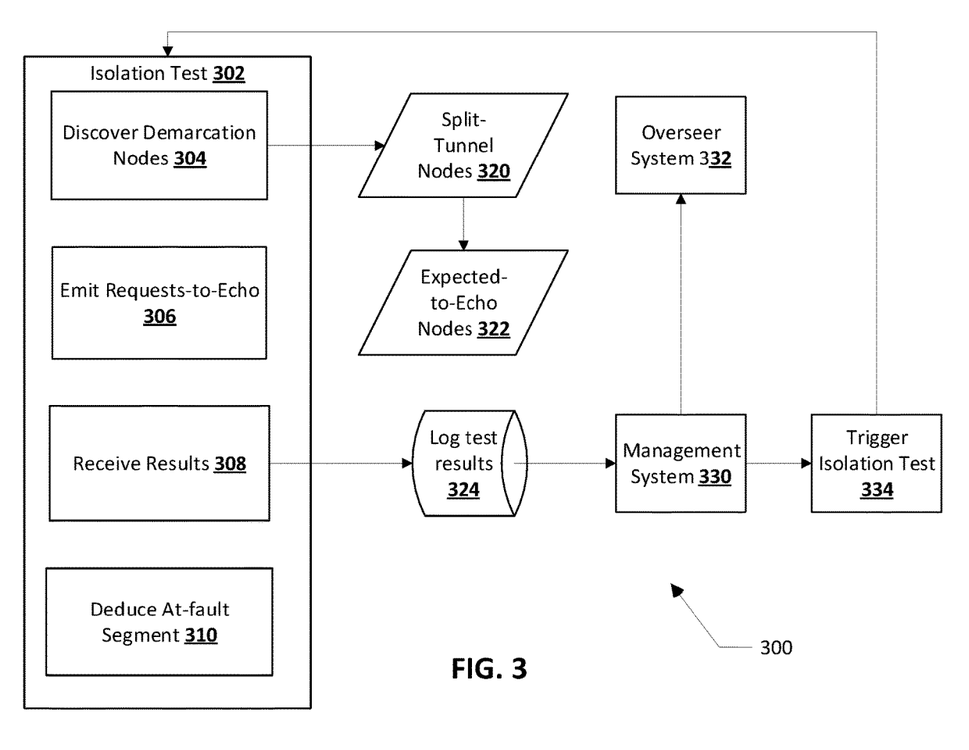
FIG. 3 illustrates a function diagram of an underlay monitor according to various embodiments.

FIG. 3 illustrates a function diagram of an underlay monitor according to various embodiments.

An underlay monitor 300 may include an isolation test 302, an overseer system 332 and a management system 330. The isolation test 302 may include a discover demarcation nodes module 304 (or discoverer) to identify a split tunnel nodes 320 data and an expected-to-echo nodes 322 data including a traceroute configuration for each identified node. The isolation test 302 may include an emit requests-to-echo module 306 (or emitter) to test packet-loss for each of the identified nodes. The isolation test 302 may include a receive results module 308 (or receiver or or calculator) to process the results, to calculate a rate of loss, and to save the results in log test results database 324. The isolation test 302 may be managed by a management system 330. The management system 330 may accumulate results for a reporting interval to compute an accumulated rate of loss and the like.

In some embodiments, the management system 330 may include a trigger isolation test module 334 to observe a misbehavior of packet traffic and to trigger a periodic performance of the isolation test 302. The trigger isolation test module 334 may observe a misbehavior of packet traffic and may trigger a periodic performance of the isolation test 302. The triggered periodic packet-loss test-runs may have a random backoff so that multiple network appliances are unlikely to concurrently perform isolation test-runs when an excessive packet-loss rate occurs in the vicinity of NEs 113 through 120 of FIG. 1. The overseer system 332 may provide reporting individual and accumulated rates-of-loss for different instances of concurrently available isolation tests.

Sample Size and Sample Rate Determination

Embodiments of the present disclosure operate on the principle of a sampling rate that permits establishing an upper bound on the error tolerance in the measured rate of packet loss in a hierarchical packet network. What became known as the fundamental law of interpolation was postulated by Harry Nyquist in 1928. To arrive at a packet-loss rate that is approximately accurate to 1% (or one part per hundred), then the Nyquist rate is 200 cycles, where a cycle here is a packet-loss test-probe of an expected-to-echo node followed by a fallow time without a packet-loss test probe to that NE until the next cycle. Conversely, a packet-loss-test cycle to one expected-to-echo node may be overlapped with the packet-loss-test cycle to a different NE, as something to do during the fallow time of the cycle to the first-mentioned NE. The cycles of packet-loss test probes to a plurality of expected-to-echo node may be overlapped up to the limit of occupying excessive bandwidth on any one link in the hierarchical packet network with mere packet-loss test probes as overhead.

In the present disclosure, various tolerances of inaccuracy in empirically measuring the rate of packet loss as percentage or fraction of the effective payload-carrying-capacity bandwidth of a link can be achieved by different number of packet-loss test-probes for each packet-loss test run. The packet-loss rate is in effect a continuous-time analog-signal curve. The packet-loss test-probes to an expected-to-echo node is in effect a discrete-time digital signal that, when of sufficient frequency, attempts to reconstruct the continuous-time analog signal via interpolation. To reconstruct a packet-loss-rate curve with an approximate accuracy of x parts per hundred (e.g., to an accuracy of 1%±0.5% for x=1 or 2%±1% for x=2 or 0.5%±0.25% for x=½), a packet-loss test-run of 2x (i.e., twice as many) cycles must be sampled.

A plurality of packet-loss test-probes are needed to achieve a target tolerance of inaccuracy in measured packet-loss rate require a test-run to not be instantaneous. Rather a packet-loss test run occurs over a nontrivial period. This plurality of packet-loss test probes to an expected-to-echo node, which take a nontrivial amount of time, are called a packet-loss test-run, or merely a test-run when context implies packet-loss. The number of packet-loss test-probes in a packet-loss test-run is herein called the size of the packet-loss test-run. The amount of time expended by a packet-loss test-run is herein called the duration of the packet-loss test-run.

In a preferred embodiment, the sample size is (also known as the size of the packet-loss test run) is configurable with a default of 2,000 packets and a sample rate of 10 per second allowing a test run to take place in approximately 200 seconds and providing an accuracy of + or −0.1%.

Figure 4:
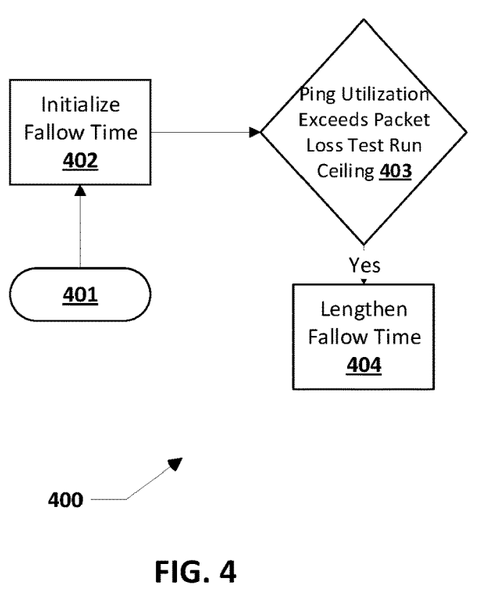
FIG. 4 illustrates a flow chart of a method for determining sampling rate and sample size according to various embodiments.

FIG. 4 illustrates a flow chart of a method for determining the sampling rate and adjusting the sampling size for a packet-loss test-run.

In FIG. 4, a method 400 for determining the sampling rate and adjusting the sampling size for a packet-loss test-run starts with operation 401. The method 400 may include operation 402 to initialize a fallow time where the default emission rate for request-to-echo packets to expected-to-echo nodes is set to 100 milliseconds (ms). So, by default 10 out-going request-to-echo packets will be emitted per second as part of operation 240 of FIG. 2 when the pinging actually takes place. Fallow time may be from the perspective of request-for-echo packets to the same expected-to-echo node. The out-going request-for-echo packets to different expected-to-echo nodes may be interleaved, so fallow time is not idle time overall. During idle time, no operations related to packet-loss test-runs are performed; fallow time is not idle time. A default sampling rate of out-going request-to-echo packets is set to 10-per-second.

The method 400 may include operation 403 to determine whether the current sampling rate multiplied by the size of each out-going request-to-echo packet multiplied by the quantity of expected-to-echo nodes exceeds the bandwidth ceiling on the test-run for one or more links to the expected-to-echo node. When the sampling rate exceeds the bandwidth ceiling, operation 404 to lengthen fallow time may be calculated by a formula based to keep the bandwidth usage under the ceiling.

Ping Point Discovery

In some embodiments, the PLIT test-run utilizes five Ping-points (PPs) to split the network up into four (4) segments to deduce which of the 4 segments are causing the packet loss. Those ping points are as follows:

Modem Ping Point (MPP)—for example the LAN IP address of Modem (104) in FIG. 1.
Ingress Ping Point (IPP)—for example NE 110 in FIG. 1.
Egress Ping Point (EPP)—for example NE 112 in FIG. 1.
VPN Gateway Ping Point (VPP)—for example Tunneling Gateway 118 in FIG. 1.
Data Center Ping Point (DPP)—for example Datacenter Host 120 in FIG. 1.

Operation 220 of FIG. 2 may assist the discovery of ping points. The initiator of a PLIT test run may perform a traceroute operation from itself (for example Host 101 in FIG. 1) to a specified destination IP address (for example Tunneling Gateway 118 in FIG. 1) and parse its results. The VPP (the destination address) is not discovered by a Traceroute operation as is made known to the initiator of a PLIT test run by some other means, for example, by configuring that IP address. This traceroute operation runs split-tunnel and not be carried by Tunnel 121. The discovering of the PPs may parse the traceroute output for relative order of and characteristics of NEs to discover the PPs, as extracted from a larger list of NEs in a collected traceroute output.

Figure 8:
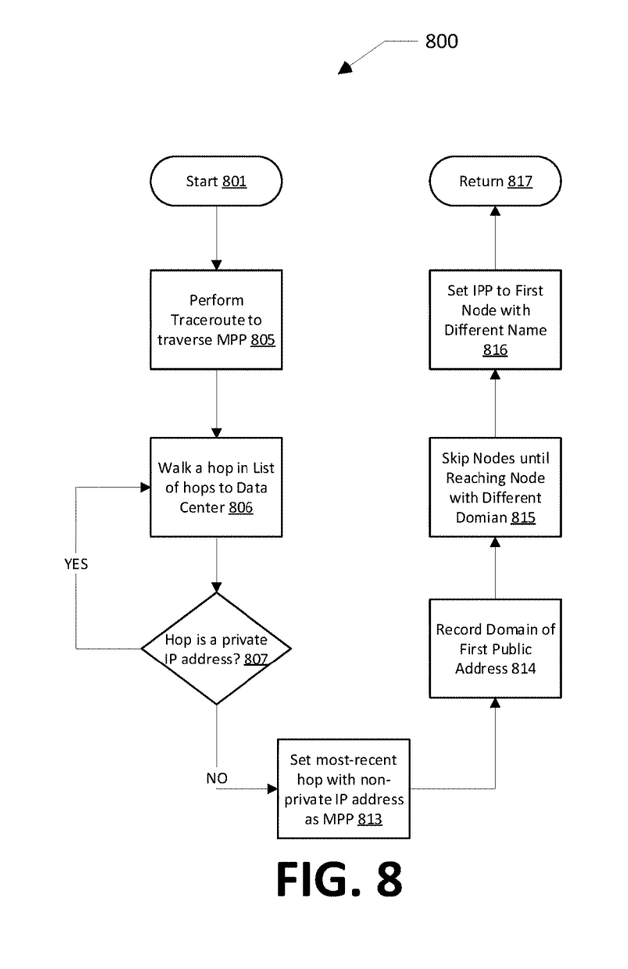
FIG. 8 illustrates a flow chart of a method for discovering a Modem Ping-point (MPP) or an Ingress Ping-point (IPP) according to various embodiments.

FIG. 8 illustrates a flow chart of a method for discovering an MPP and/or an IPP according to various embodiments. This fits into a PLIT Test run as illustrated by operation 224 of FIG. 2.

A method 800 for discovering an MPP or an IPP begins at operation 801 start. Method 800 may be disposed in an underlay monitor, for example, within a network element or host of FIG. 1. The method 800 may include operation 805 to obtain a list of hops from the underlay monitor's node (aka the PLIT Test run initiator) to the Tunnel Gateway (FIG. 1, NE 118) utilizing a traceroute operation that gets the domain name for each hop. The method 800 may include operation 806 to examine in a branch to datacenter order a hop in the list of hops reported by the traceroute protocol. The method 800 may include operation 807 to ignore hops whose IP addresses are within any of IETF's RFC1918-defined private IP address-spaces.

The method 800 may include operation 813 to deduce that the MPP has already been traversed as the most-recent hop with a non-private IP-address. When this is the case, the MPP is the last private IP address prior to the non-private IP address. The determination of the IPP continues as follows. The method 800 include operation 814 to record the domain of the first public IP address. As is well known in the art, an example of a node with a domain name of "xyz.verizon.net"has a domain of".verizon.net". The method 800 may include operation 815 to skip nodes that have the same domain until it reaches a node with different domain then the domain recorded by operation 814. The method 800 may include operation 816 to set the IP address of the first node with a different domain name as the IPP. This completes the MPP/IPP determination (return block 817).

Figure 9:
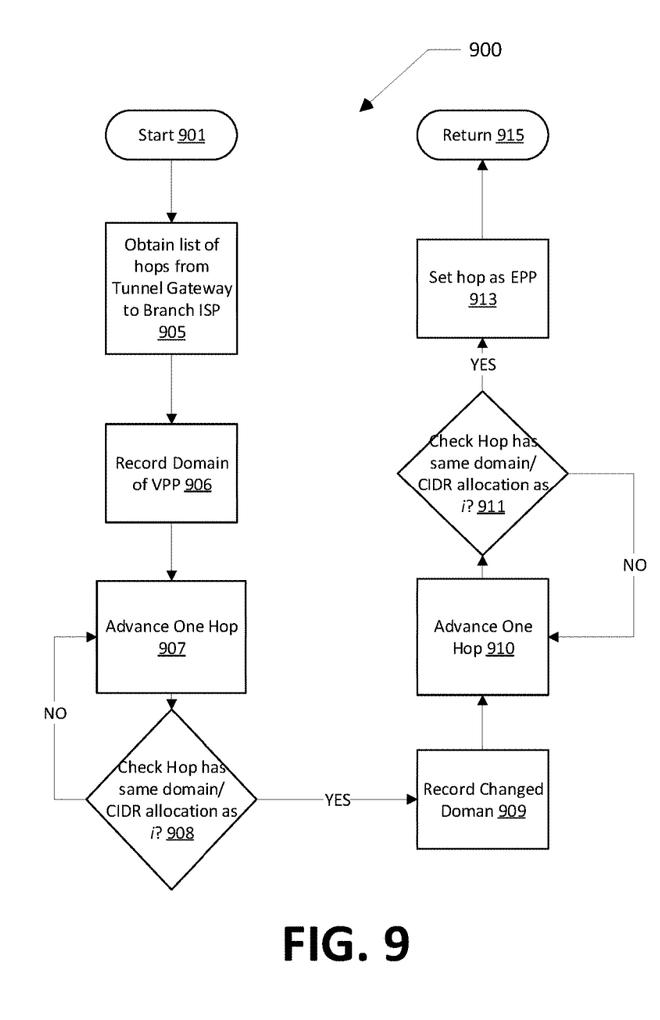
FIG. 9 illustrates a flow chart of a method for discovering an EPP according to various embodiments.
Figure 10:
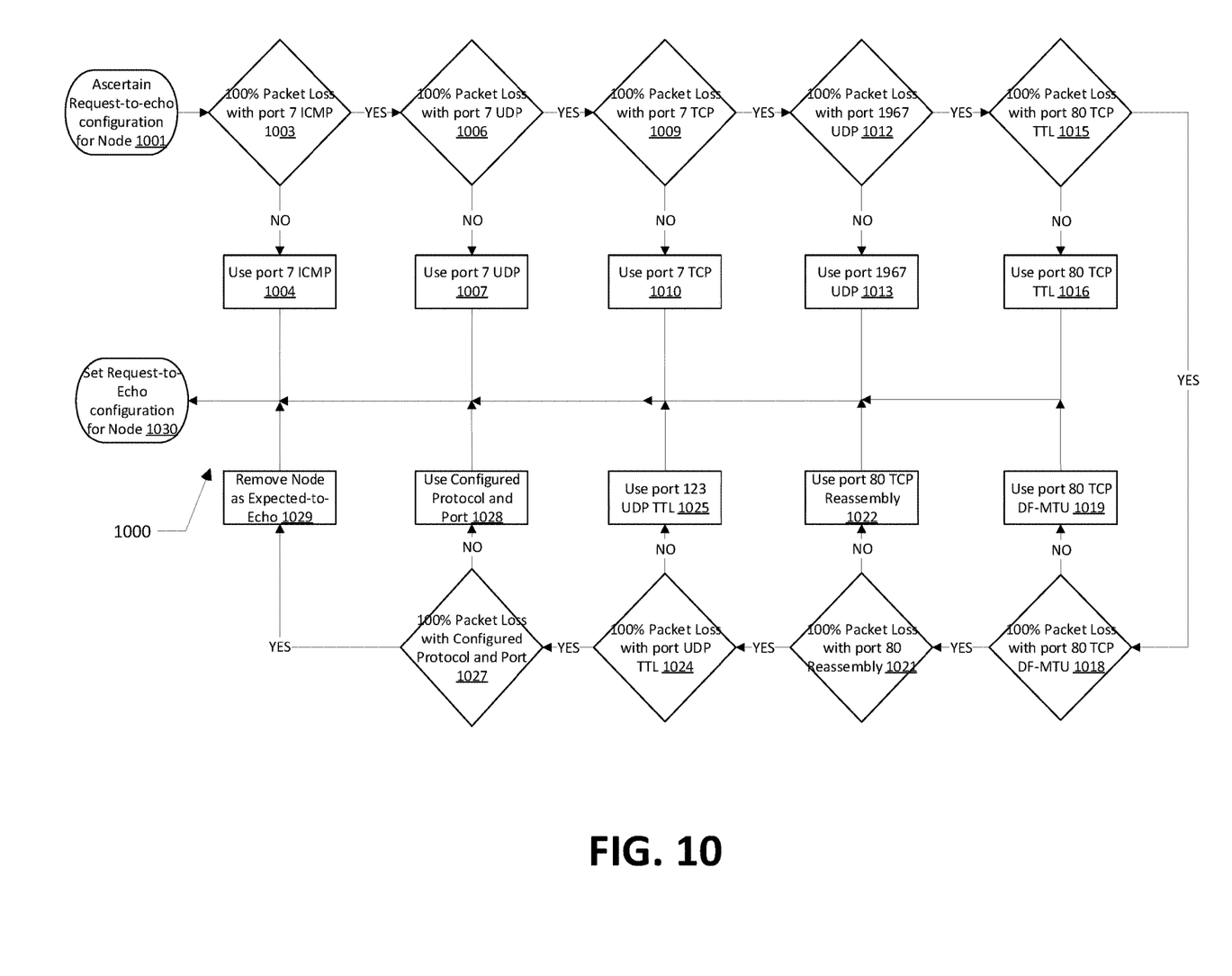
FIG. 10 illustrates a flow chart of a method for ascertaining a request-to-echo configuration for a node according to various embodiments.

FIG. 9 illustrates a flow chart of a method for discovering an EPP according to various embodiments.

A method 900 for discovery of EPP by an underlay monitor in a node starts at operation 901 is the start. The method 900 may include operation 905 to obtain a list of hops from the underlay monitor's node (aka the PLIT Test run initiator) to the Tunnel Gateway (FIG. 1 NE 118) utilizing whichever traceroute operation which includes getting the domain name for each hop. The method 900 may include operation 906 to examine/walk in a datacenter to a branch order a hop in the list of hops reported by the traceroute protocol. The last hop is the VPP. Operation 906 records the domain (e.g. if the domain name is "xyz.hughes.com"the domain is".hughes.com") of the VPP. The objective is to walk backwards to find the last hop that is part of the data center, then to find the domain of the data center ISP (FIG. 1 NE 113) and then to find the first hop in the public Internet (FIG. 1 NE 112). Operation 907 advances one hop from the data center towards the branch office. Operation 908 determines whether the domain has changed and jumps back to operation 907 if not. If so, operation 909 is executed which records the changed domain. Operation 910 advances one hop from the data center toward the branch office. Operation 911 determines whether the domain has changed and jumps back to operation 910 if so. If not, the EPP has been determined and operation 912 records its address that of the changed node. Operation 913 returns from this procedure.

Figure 7:
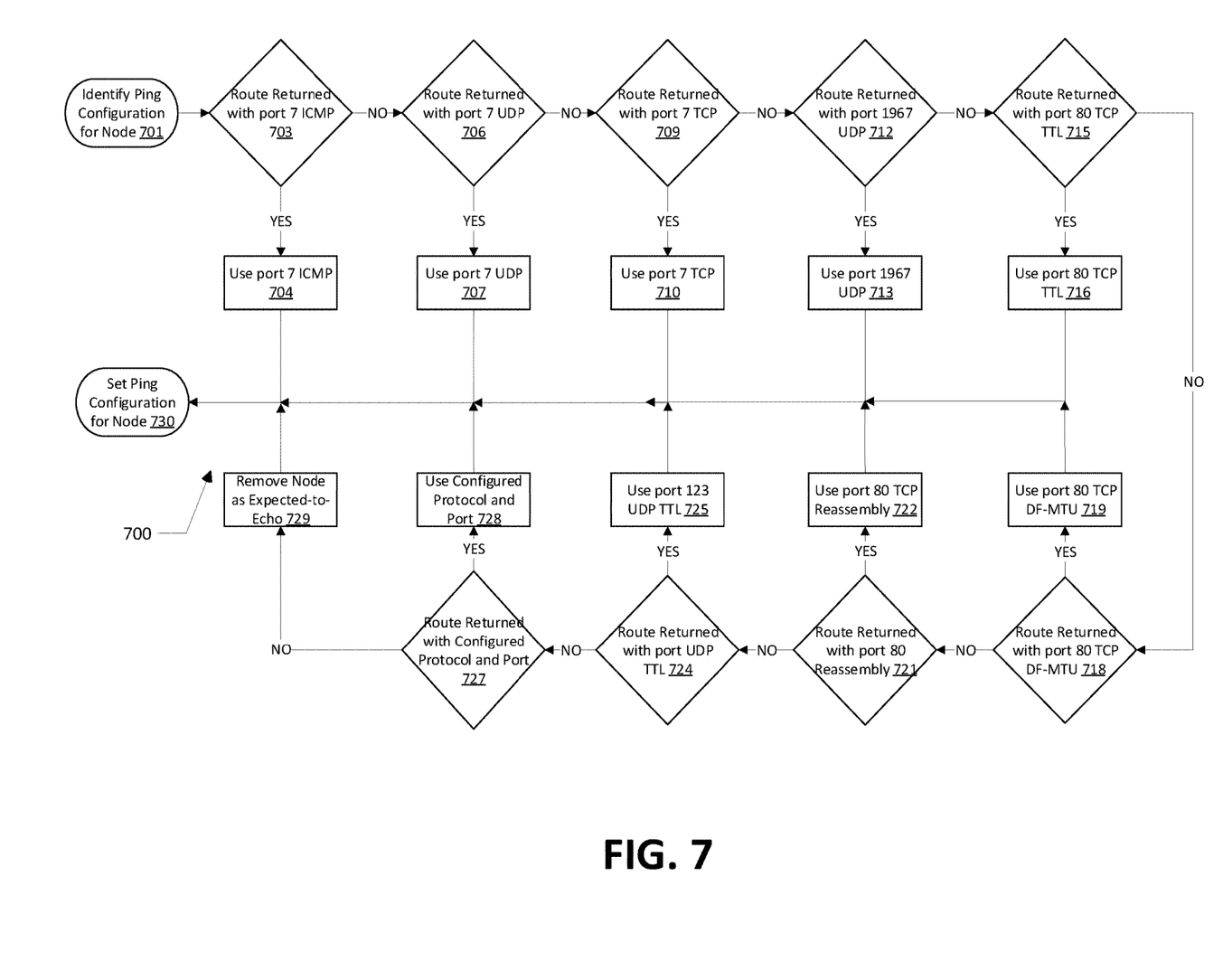
FIG. 7 illustrates a flow chart of a method for identifying a ping configuration for a node according to various embodiments.

FIG. 7 illustrates a flow chart of a method for identifying a ping configuration for a node according to various embodiments. Identifying a ping configuration for a node consists of attempting different types of "ping operations" combinations until one is found that produces acceptable results. The resulting trace route combination can then be used to ping such a node to determine packet loss from the initiator of the PLIT test run to that node. An embodiment may use simple ICMP echo operations when this identifying a ping configuration is not performed.

A method 700 for determining ping configuration for a node may start at operation 701 to identify a ping configuration for a node. A multitude of different embodiments of method are valid when a different ordering of determining which traceroute protocol x is utilized prior to another traceroute protocol y, for every pairwise combination of x and y for each x, y per the table below.

|  | Ping Protocol x | | |
|---|---|---|---|
|  | Ping Configuration | Operation to Check Availability | Set Ping Configuration |
| Ping Protocol y | ICMP Port 7 echo | 703 | 704 |
|  | UDP Port 7 echo | 706 | 707 |
|  | TCP Port 7 echo | 709 | 710 |
|  | UDP Port 1967 Cisco SLA | 712 | 713 |
|  | TCP Port 80, TTL-time-exceeded | 715 | 716 |
|  | TCP Port 80, DF-MTU-exceeded | 718 | 719 |
|  | TCP Port 80, reassembly-time-exceeded | 721 | 722 |
|  | UDP Port 123, TTL-time-exceeded | 724 | 725 |
|  | User Configured Port and Protocol | 727 | 728 |

The method 700 may include operation 703 using IETF's RFC792 ICMP echo in the Ping Protocol (a.k.a., ping(1) command in Unix/Linux) as the ping configuration to the affected expected-to-echo node during a packet-loss test-run to the standard ICMP echo port 7. Some system administrators of packet networks consider the topology information partially revealed by replying to the ICMP port-7 echo-request to be a security risk, so the system administrator might inhibit the ICMP port-7 echo-request and/or its ICMP reply or even all ICMP replies in general; operation 703's choice of ping configuration might not work properly for an expected-to-echo node or a plurality thereof. Upon a successful response from operation 703, operation 704 sets the protocol/port for the node to ICMP port-7 echo request.

The method 700 may include operation 706 to try IETF's RFC862 echo to UDP port 7 in Echo Protocol as the ping configuration to the expected-to-node and operation 707 to set the ping configuration accordingly upon receiving a success response.

The method 700 may include operation 709 to try IETF's RFC862 echo to Transport Control Protocol (TCP) port 7 in Echo Protocol as the ping configuration to expected-to-echo node and operation 710 to set the ping configuration accordingly upon receiving a success response.

The method 700 may include operation 712 to try Cisco's Internet Protocol (IP) Service Level Agreement (SLA) feature's echo to User Datagram Protocol (UDP) port 1967 as the ping configuration to expected-to-echo node and operation 713 to set the ping configuration accordingly upon receiving a success response. Some system administrators of packet networks consider the topology information partially revealed by replying to the UDP port-1967 SLA-analysis session-request to be a security risk, so the system administrator might inhibit UDP port-1967 SLA-analysis and/or its UDP reply and/or its subsequent UDP port-2020 exchange; hence operation 712's choice of ping configuration might not work properly for an expected-to-echo node or a plurality thereof.

The method 700 may include operation 715 to try using a small amount of innocuous HTTP text (e.g., some whitespace) via TCP port 80 with the time-to-live (TTL) parameter set to a threshold number of hops as the ping configuration to expected-to-echo node and operation 716 to set the ping configuration accordingly upon receiving a success response. Under IETF's RFC792 (and as utilized by the canonical traceroute protocol in IETF's RFC1393), a node in a packet network that receives an IP packet whose TTL is then decremented to zero (indicating end-of-life of the IP packet) destined for a node further downstream is expected to emit an ICMP packet back to the originator of the IP packet announcing the failed attempt to send the IP packet to the downstream node. The reply is an ICMP packet whose fields are type of 11 (time-exceeded message) and code 0 (TTL exceeded in transit). Some system administrators of packet networks consider the topology information partially revealed by ICMP TTL-exceeded-in-transit replies to send to be a security risk, so the system administrator might inhibit the ICMP packet or even all ICMP replies in general; hence operation 715's choice of ping configuration might not work properly for an expected-to-echo node or a plurality thereof.

The method 700 may include operation 718 of using innocuous HTTP text (e.g., some whitespace in one embodiment) of length longer than the maximum transmission unit (MTU) quantity of bytes and with the don't-fragment (DF) indicator true via TCP port 80 as the ping configuration to expected-to-echo node and operation 719 to set the ping configuration accordingly upon receiving a success response. As the lengthy HTTP innocuous text undergoes a segmentation-and-reassembly (SAR) functionality that is be inhibited by the DF indicator though. Under IETF's RFC792, a node in a packet network that receives an IP packet whose length exceeds the packet network's MTU but whose DF indicator is true is expected to emit an ICMP packet back to the originator of the IP packet announcing the failed attempt to send the IP packet to the downstream node. The reply is an ICMP packet whose fields are type of 3 (destination-unreachable message) and code 4 (fragmentation needed but DF is true).

The method 700 may include operation 721 to use a small amount of innocuous network time protocol (NTP) via TCP port 80 with TTL parameter set to the number of hops as the ping configuration to expected-to-echo node and operation 722 to set the ping configuration accordingly upon receiving a success response. Under IETF's RFC792 (and as utilized by traceroute protocol in IETF's RFC1393), a node in a packet network that receives an IP packet whose TTL is then decremented to zero (indicating end-of-life of the IP packet) destined for a node further downstream is expected to emit an ICMP packet back to the originator of the IP packet announcing the failed attempt to send the IP packet to the downstream node. The reply is an ICMP packet whose fields are type of 11 (time-exceeded message) and code 0 (TTL exceeded in transit).

The method 700 may include operation 724 to try UDP as the ping configuration to port 123 with a TTL-time exceeded as trace-to-echo node and operation 715 to set the ping configuration accordingly upon receiving a success response.

The method 700 may include operation 727 to try user-configured port number for user-configured TCP or UDP type of packets as the ping configuration to expected-to-echo node and operation 728 to set the ping configuration accordingly upon receiving a success response.

The method 700 may include operation 729 to consider a ping configuration to an affected expected-to-echo node to be impractically difficult and removing the node from the set of expected-to-echo nodes. The method 700 may include operation 730 to set the ping configuration for the impractically difficult node.

The ping point discovery process of method 700 may take within a short period of time, for example, 120 seconds following a WAN becoming active, or transitioning out of nonoperation, out-of-service (OoS), lack-of-service (LoS) or the like and may take place periodically thereafter. Alternatively, the Ping Point discovery may take place as the first phase of a PLIT Test Run.

Ping Operations

As already described by FIG. 2 operation 240, a PLIT Test run includes actually "pinging" the various ping-points. In some embodiments, parameters for a PLIT test-run's ping-transactions may be configurable. Exemplary parameters include:

Ping-Request Packet Size (for example 125 bytes)—the total size of each ping-request's Internet Control Message Protocol (ICMP) packet, including header. The actual packet size may be clamped to be less than the WAN MTU.

Number of Ping-Requests per PP (for example, 2000 ping-request packets per PP). See the Sample Size and Sample Rate section.

Target Ping-Requests Per Sec (for example, 10 per sec)—the number of ping-requests per second for each in-progress ping transaction. This may be adjusted to be less frequent as described the Sample Size and Sample Rate Determination section.

Maximum Capacity Percent (for example, 20%)—the maximum amount of WAN-transport capacity (as measured by upstream and downstream target bit rate) to be used by the PLIT test-run. A low-capacity WAN transport may significantly lengthen the duration of the PLIT test-run.

Maximum Duration Seconds (for example, 600 seconds)—a test will be aborted if, for whatever reason, it takes more than this number of seconds to complete.

Figure 5:
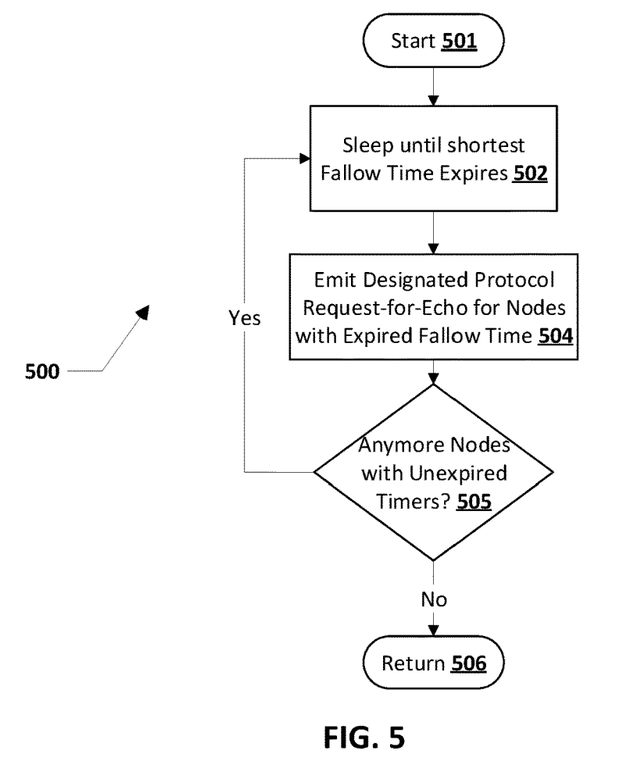
FIG. 5 illustrates a flow chart of a method for emitting requests-to-echo to the expected-to-echo nodes according to various embodiments.

FIG. 5 illustrates a flow chart of a method for emitting requests-to-echo to the expected-to-echo nodes according to various embodiments.

In FIG. 5, a method 500 for emitting requests-to-echo to the expected-to-echo nodes starts with operation 501. As part of 501, the first fallow timeout for each ping point is scheduled to be equally apart so that the pinging does not cause a spike of traffic from having pings be emitted simultaneously. The method 500 may include operation 502 to sleep until a shortest fallow time until the next request-to-echo packet is to be emitted to some expected-to-echo node has expired. The method 500 may include operation 504 to emit the request-to-echo packet in an expected-to-echo node's currently-designated request-to-echo protocol for each node whose fallow time has expired. The method 500 may include operation 505 to determine whether any more expected-to-echo nodes in the set still have any remaining expired fallow timers. The method 500 may include operation 506 to end the method.

Packet Loss Tabulation

When the pinging has been completed (FIG. 2, operation 240), the packet loss and burst packet loss rates of each ping operation may be computed (FIG. 2, operation 250)

In the present disclosure, sequences of lost packet-loss test-probes are called burst packet-loss. By their nature, the steep slope of the analog-domain curve of onset of packet loss and the steep slope of the analog-domain curve of abatement of packet loss is beyond what the Nyquist rate of sampling can reconstruct. The present disclosure presents burst packet-loss as an entirely separate category of packet loss than the gradually-increasing and gradually-decreasing curve that packet-loss rate is reconstructing. In this present disclosure, the longest burst packet loss observed per packet-loss test-run is calculated when the Nyquist rate was insufficient to reconstruct the analog-domain curve of packet loss experienced due to an excessively steep slope.

In some embodiments, the present disclosure calculates rate of a packet-loss per test-run and maximum burst of packet-loss per test-run. These calculations may be reported, for example, in tabular form rolled up at the intervals of per-test-run, per-hour, per-day, per-week, or the like. The calculations may be used for automated logical-deduction to infer the most-likely segment of the hierarchical packet network at-fault during periods of excessively high rate of packet loss or excessively long burst of packet loss.

Furthermore, for each ping operation (for each ping-point) an evaluation may be made whether the packet loss is excessive by comparing, for example, the packet loss rate against a configurable threshold (e.g. 0.5%) and comparing the burst packet loss against a configuration threshold number of consecutive lost packets (e.g., 3). This excessive or not excessive evaluation is used as part of the Ping Test Results Evaluation (FIG. 2, operation 280).

Ping Test Results Evaluation

When the pinging has been completed (FIG. 2, operation 240) and the packet loss and burst packet loss rates of each ping operation have been computed (FIG. 2, operation 250) the evaluation of those results may take place (FIG. 2, operation 280) to deduce an at-fault network segment.

Figure 6:
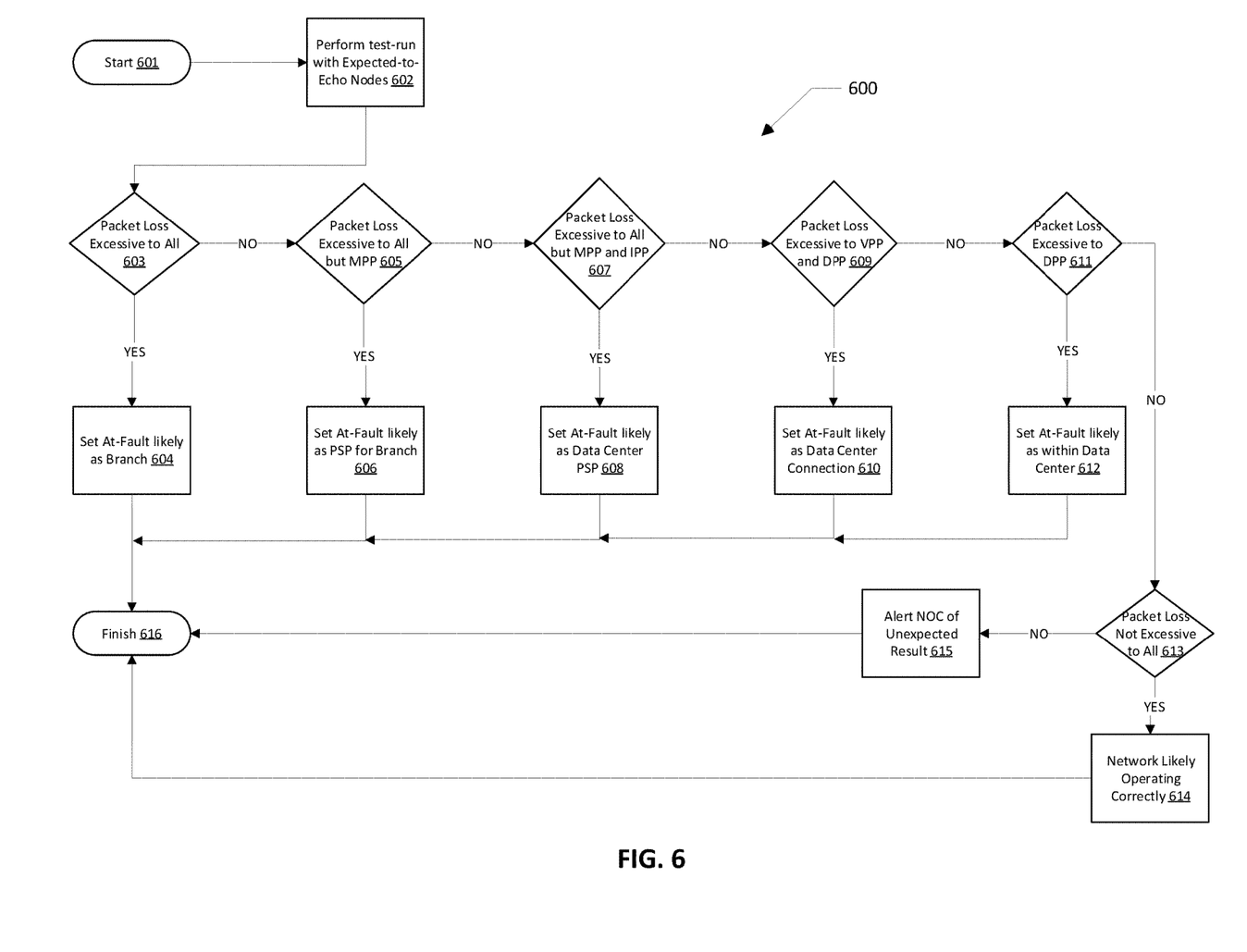
FIG. 6 illustrates a flow chart of a method for deducing an at-fault segment according to various embodiments.

FIG. 6 illustrates a flow chart of a method for deducing an at-fault segment according to various embodiments.

In FIG. 6, a method 600 for deducing a most likely at-fault segment for excessive packet-loss rate or excessive packet-loss burst-length starts with operation 601. The method 600 may be used in a hierarchical packet network, for example, in the packet network 100 of FIG. 1. The method 600 is for excessive packet-loss rate considered in isolation or for excessive packet-loss burst-length considered in isolation, even when both excessive packet-loss rate and excessively-lengthy burst-loss are occurring concurrent in the same segment of the packet network 100 or among various segments of the packet network 100.

The method 600 may include operation 603 to determine whether excessive rate of packet loss or excessive burst-length of packet loss occurred in all members of the set deducing a fault within the branch office per operation 604.

The method 600 may include operation 605 to determine whether excessive rate of packet loss or excessive burst-length of packet loss occurred in all but the MPP, i.e., {IPP, EPP, VPP, DPP}. The method 600 may include operation 606 for deducing that the most-likely at-fault segment is a branch PSP or IPP.

The method 600 may include operation 607 to determine whether an excessive rate of packet loss or excessive burst-length of packet loss occurred in nodes other than the MPP or the IPP, i.e., {EPP, VPP, DPP}. The method 600 may include operation 608 to deduce that the most-likely at-fault segment is the public internet.

The method 600 may include operation 609 to determine whether excessive rate of packet loss or excessive burst-length of packet loss occurred in either a tunneling gateway or a datacenter expected-to-echo node, i.e., the set {VPP, DPP}. The method 600 may include operation 610 to deduce that the most-likely at-fault segment is in the datacenter ISP.

The method 600 may include operation 611 to determine whether the excessive rate of packet loss or excessive burst-length of packet loss occurred at the DPP. The method 600 may include operation 612 to deduce that the most-likely at-fault segment is the datacenter LAN.

The method 600 may include operation 613 to determine whether a lack of excessive packet-loss rate or excessively-lengthy burst-loss was observed at all the expected-to-echo nodes, i.e., the set {MPP, IPP, EPP, VPP, DPP}. The method 600 may include operation 614 to deduce that the packet network is operating well enough end-to-end. The method 600 may include operation 615 to deduce that the packet loss is excessive but that the source of the packet loss cannot be easily identified as any single segment. The method 600 may include the operation 616 of finishing.

Exemplary results for a PLIT run may include:
the start time of the most recent test-run,
the tested WAN's IPP and EPP that was discovered,
the cause that triggered the test-run,
the amortized packet loss rate from each ping operation,
the number of packets lost as the largest contiguous burst from each ping operation,
the number of ping-reply packets that were not lost but arrived out-of-sequence (counting those whose sequence ID was later than would have been expected in strictly-ascending order) from each ping operation,
the size of the ping-request packets used, including header,
the time-delay from 1 set of ping requests to the start of the next set of ping requests, and
The automated evaluation of the results from FIG. 6.

In some embodiments, the PLIT may arithmetically account for a loss of a ping-reply packet (which may be smaller) as a loss of its corresponding ping-request packet. In some embodiments, the PLIT may not determine whether a ping-request or a ping-reply packet was lost. In some embodiments, a PLIT test-run may have an upper bound of bandwidth occupancy, for example, 20%, to limit a PLIT test-run's consumption of the WAN's Active Quality of Service (QOS) estimated capacity. In some embodiments, this upper bound of bandwidth occupancy may be configurable at run-time. In some embodiments, a PLIT test-run's ping packets may be given priority over other traffic and the bandwidth available to other traffic may be reduced to make room for the PLIT test run traffic.

PLIT Test Run Initiation

In some embodiments, a PLIT may be initiated periodically when an independent measurement of packet loss being experienced, for example, by packets traversing tunnel 121, remains above a threshold (for example, 2%) over an evaluation period. In other embodiments, a periodic PLIT test-run may be initiated regardless of the WAN transport's amortized packet loss. In some embodiments, a PLIT may include a randomized startup delay when a trigger, for example, a packet-loss above a threshold, for a PLIT test-run is observed. This randomized delay may decrease the chance of modems 104, multiple underlay monitors in the vicinity of the host 101, the branch LAN 102, the tunneling router 103, or the modem 104 concurrently observing excessive packet loss downstream, for example, in the vicinity of 110 to 120. This randomized delay may also decrease the load on the Tunneling Gateway (118) and the EPP (NE 116) on handling pings as the number of simultaneous PLIT tests is reduced by occurring randomly.

In some embodiments, the PLIT may be automatically initiated when the repeated presence of a packet loss is detected. For example, the PLIT may be initiated with a trigger when a number (for example, 3) or more of a consecutive burst result in a failed datagram transactions several times (for example, 3 times) within a set time frame (for example, 2 hours).

In some embodiments, the transmission of requests-to-echo may be coordinated so that packet requests are sent in batches and so that the order of the requests-to-echo transmissions (MPP, IPP, EPP, VPP) rotates with each batch of requests-to-echo, for example, rotates every 100 ms.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for isolating packet loss on a hierarchical packet network, the method comprising:
   connecting a first Network Element (NE) to a second NE via a varying path traversing multiple network segments;
   discovering, with the first NE, a set of segment-demarcation expect-to-echo nodes along the varying path;
   ascertaining, with the first NE, a request-to-echo configuration for each node in the set;
   emitting a sample size of requests-to-echo in a respective request-to-echo configuration for each node in the set at a sample rate;
   receiving results of the sample size of requests-to-echo to generate a packet-loss sample;
   calculating a rate-of-loss for the packet-loss sample;
   accumulating multiple packet-loss samples over a reporting interval; and
   calculating an accumulated rate-of-loss for the reporting interval with the multiple packet- loss samples,
   wherein the emitting emits packets marked with different Class of Service (CoS)-categorizers per packet-loss sample in a round-robin fashion for the reporting interval.

2. The method of claim 1, wherein the emitting comprises emitting from multiple locations, and the method further comprises gathering the packet-loss samples from the multiple locations; and correlating the gathered multiple packet-loss samples to a geospatial map or one of the segments along the network path.

3. The method of claim 1, wherein the discovering comprises identifying a traceroute protocol for each node of the set.

4. The method of claim 3, wherein a traceroute configuration for each node comprises an Internet Control Message Protocol (ICMP) port 7 echo request-to-echo, a Transmission Control Protocol (TCP) port 7 echo request-to-echo, a User Datagram Protocol (UDP) port 7 echo request-to-echo, a UDP port 1967 request-to-echo, or a combination thereof.

5. The method of claim 1, wherein the set comprises a Modem Ping-point (MPP), an Ingress Ping-point (IPP), an Egress Ping-Point (EPP) or a combination thereof.

6. The method of claim 1, wherein the first NE comprises a split-tunnel connection along a network path, and the discovering discovers different segment-demarcation nodes along the split-tunnel connection.

7. The method of claim 6, further comprising discerning an onset of excessive rate of packet-loss by comparing the rate-of-loss with an onset threshold; comparing the results along the split-tunnel connection; and deducing an at-fault segment based on the comparison.

8. The method of claim 1, wherein the request-to-echo configuration comprises a TTL-time-exceeded traceroute request-to-echo, a fragmentation-reassembly-time-exceeded traceroute request-to-echo, a Don't Fragment-Maximum Transmission Unit (DF-MTU) destination-unreachable traceroute request-to-echo, a User Datagram Protocol (UDP) packet destined for port 123 with a Time to Live (TTL) set to decrement to zero at a respective node, a Transmission Control Protocol (TCP) packet for a port other than 80 with a TTL set to decrement to zero at the respective node, an Internet Control Message Protocol (ICMP) port 7 echo request-to-echo, a TCP port 7 echo request-to-echo, a UDP port 7 echo request-to-echo, a UDP port 1967 request-to-echo, a configured protocol and port, or a combination thereof.

9. The method of claim 1, wherein the request-to-echo configuration comprises multiple request-to-echo configurations, and
   the ascertaining comprises sending, in parallel, a request-to-echo in each of the multiple request-to-echo configurations.

10. The method of claim 1, wherein the receiving comprises tabulating packet responses and packet losses.

11. The method of claim 1, wherein the calculating calculates a length-of-burst-loss for the packet-loss sample.

12. The method of claim 1, further comprising deducing an at-fault segment by comparing the rate-of-loss with an onset threshold for the results.

13. The method of claim 1, further discerning an abatement of already-onset excessive rate of packet-loss is by comparing the rate-of-loss with an abatement threshold, or an end of a reporting interval.

14. The method of claim 1 further comprising observing a misbehavior of packet traffic, with a third NE different from the first NE and the second NE; and
   triggering a periodic performance of the emitting.

15. The method of claim 1, wherein the hierarchical packet network comprises a single-CoS layer-3 network, a single-CoS WAN network, a CoS-categorized layer-3 network, a CoS-categorized WAN network, a CoS-categorized Layer-2 container network, or a combination thereof.

16. The method of claim 1, further comprising determining the sample size and the sample rate based on a bandwidth subscription of the first NE.

17. An underlay monitor to isolate packet loss on a hierarchical packet network, the underlay monitor comprising:
- a first Network Element (NE) connected to a second NE via a varying path traversing multiple network segments;
- a discoverer to discover, with the first NE, a set of segment-demarcation expect-to-echo nodes along the varying path, and to ascertain, with the first NE, a request-to-echo configuration for each node in the set;
- an emitter to emit a sample size of requests-to-echo in a respective request-to-echo configuration for each node in the set at a sample rate;
- a receiver to receive results of the sample size of requests-to-echo to generate a packet-loss sample; and
- a calculator to calculate a rate-of-loss for the packet-loss sample,
- wherein the receiver accumulates multiple packet-loss samples over a reporting interval,
- the calculator further calculates an accumulated rate-of-loss for the reporting interval with the multiple packet-loss samples, and
- the emitting emits packets are marked with different Class of Service (CoS)-categorizers per packet-loss sample in a round-robin fashion for the reporting interval.

18. The underlay monitor of claim 17, wherein the discoverer identifies a traceroute protocol for each node of the set.

* * * * *